(12) United States Patent
Amador et al.

(10) Patent No.: US 7,560,662 B2
(45) Date of Patent: Jul. 14, 2009

(54) EQUIPMENT AND PROCESS FOR APPLYING AN EXTERNAL STRUCTURAL WELD TO PIPING AND SIMILARLY SHAPED PRESSURE BOUNDARY COMPONENTS

(75) Inventors: Pedro Amador, Lawrenceville, GA (US); James Sculley, Duluth, GA (US); Jeffrey Madill, Duluth, GA (US); Jack Stoner, Lawrenceville, GA (US); Dixon Parker, Smyrna, GA (US); Casey Power, Charleston, SC (US)

(73) Assignee: Welding Services, Inc., Norcross, GA (US)

( * ) Notice: Subject to any disclaimer, the term of this patent is extended or adjusted under 35 U.S.C. 154(b) by 231 days.

(21) Appl. No.: 11/463,565

(22) Filed: Aug. 9, 2006

(65) Prior Publication Data

US 2008/0035620 A1 Feb. 14, 2008

(51) Int. Cl.
*B23K 9/028* (2006.01)
*B23K 9/12* (2006.01)
*F16M 11/00* (2006.01)

(52) U.S. Cl. .................. 219/125.1; 219/60 A; 219/61.5; 219/158; 248/176.1

(58) Field of Classification Search ............... 219/60 A, 219/60.2, 61, 125.11, 125.12, 59.1; 248/176.1
See application file for complete search history.

(56) References Cited

U.S. PATENT DOCUMENTS

| | | | | |
|---|---|---|---|---|
| 3,008,037 A | * | 11/1961 | Harmes | 219/161 |
| 3,515,844 A | * | 6/1970 | James et al. | 219/124.22 |
| 3,598,347 A | * | 8/1971 | Marburger | 248/654 |
| 4,144,992 A | * | 3/1979 | Omae et al. | 228/102 |
| 4,179,059 A | * | 12/1979 | Chang et al. | 228/103 |
| 4,260,870 A | * | 4/1981 | Sekino et al. | 219/124.33 |
| 4,346,808 A | * | 8/1982 | Garlung et al. | 212/318 |
| 4,373,125 A | * | 2/1983 | Kazlauskas | 219/60 A |
| 4,429,497 A | * | 2/1984 | Dibernardi | 52/27 |
| 5,465,946 A | * | 11/1995 | Smith | 269/75 |
| 2006/0081740 A1 | * | 4/2006 | Bellavance | 248/176.1 |

FOREIGN PATENT DOCUMENTS

JP 55016743 A * 2/1980

* cited by examiner

*Primary Examiner*—Tu B Hoang
*Assistant Examiner*—Stephen J Ralis
(74) *Attorney, Agent, or Firm*—Greenberg Traurig, LLP (57) ABSTRACT

An apparatus and/or process for applying a weld overlay to a nozzle or piping spool of complex configuration is disclosed. In an exemplary embodiment, the welding apparatus comprises a mounting assembly having a plurality of magnetic foot pads, a tension support rod attached at one end to one of the magnetic foot pads, an upper attachment pad at the opposite end of the rod, and a bottom attachment pad attached to at least one other magnetic foot pad; a travel guide, the travel guide attached to the upper attachment pad at one end and the bottom attachment pad at the other end; and a head assembly attached to the travel guide, the head assembly having: i) a track ring assembly having an inner ring and an outer ring, ii.) at least two opposed weld heads attached to the inner track ring, iii.) at least one movable wire feed drive mechanism on the track ring, and iv.) a drive mechanism located on the outer ring of the track ring, the drive mechanism adapted to permit rotation of the inner ring and the weld heads around the component to be welded.

17 Claims, 7 Drawing Sheets

EQUIPMENT AND PROCESS FOR APPLYING AN EXTERNAL STRUCTURAL WELD TO PIPING AND SIMILARLY SHAPED PRESSURE BOUNDARY COMPONENTS

BACKGROUND

1. Technical Field

The present invention relates to a system and/or method for overlaying metal piping with a weld overlay. More specifically, a process and/or apparatus for applying a weld overlay to piping, fittings or nozzles utilizing a welding apparatus is disclosed.

2. General Background

Pipes, fittings, and nozzles are subject to degradation or material failure in a mechanical system. To prevent or fix this problem, weld overlays are often placed over theses areas to either repair damage or to prevent failure of the original boundary materials with pre-emptive reinforcement. Applying a weld overlay to a structural component will protect the integrity of the mechanical system.

Conventional orbital welding equipment systems that rely on either single or double weld heads typically require vertical-up application of a weld overlay that applies a weld bead only on one side of the pipe. After the first weld bead is placed on approximately half (180°) of the piping system. Then, the apparatus would need to be re-positioned, the equipment and cables being re-wrapped to the opposite side of the piping. A second weld bead would then be placed on the opposite side. Many passes on both sides of the pipe would typically be required to cover the length of the pipe section to be reinforced and to build the thickness of the weld overlay.

SUMMARY

In one embodiment of the present disclosure, an orbital welding apparatus is adapted to apply an external structural weld to a component, the apparatus comprising a mounting assembly having a plurality of magnetic foot pads, a rod attached at one end to one of the magnetic foot pads, an upper attachment pad at the opposite end of the rod, and a bottom attachment pad attached to at least one other magnetic foot pad; a travel guide, the travel guide attached to the top attachment at one end and the bottom attachment at the other end; and a head assembly attached to the travel guide by a mounting bracket, the head assembly having a track ring assembly having an inner ring and an outer ring, at least two weld heads attached to the inner ring on opposite sides of the inner ring to apply the weld overlay to the component, two wire feed drive mechanisms on the track ring on the opposite side of the track ring, the wire feed mechanisms being movable to permit placing the track ring around the component and a drive mechanism located on the outer ring of the track ring, the drive mechanism including a chain fixed to the inner ring to permit rotation of the inner ring and the weld heads around the component to be welded.

Another embodiment of the apparatus of the present invention includes three magnetic foot pads. In this embodiment, the lower attachment pad is located on the center of a bar attaching the two magnetic pads not attached to the tension support rod. Attaching the attachment pads to the travel guide provides a magnetically attached, cantilevered weld head assembly that remains independent of the component section to receive the weld overlay.

Another embodiment of the present invention is that the weld head torches are attached to a control module that monitors the weld height control programming so that the torches will adjust to follow the contours of the component transitions Another embodiment of the present invention provides a system that further comprises a camera attached to each welding head to enable remote monitoring of weld bead placement and weld puddle dynamics.

In an additional embodiment, the disclosed apparatus and method permits use of welding equipment to apply a weld overlay on piping systems without the need to attach to the member that is to be welded.

In yet another embodiment of the present invention, the process relates to a method of applying an external weld overlay to a component wherein the process comprises attaching an apparatus to an adjacent structure with a mounting assembly having a plurality of magnetic foot pads, the mounting assembly attached to a travel guide; aligning a head assembly having an inner track ring and an outer track ring around a centerline axis of the component to be welded, the inner track ring including as least two weld heads placed on opposite sides of the track ring; initiating the weld torch head located at the lowest point of the weld overlay; engaging a chain drive fixed to the inner track ring and rotating inner track ring and the attached weld heads, the weld head torches rotating about 180 degrees and placing a weld bead on the component; terminating the first weld torch; and initiating the second weld torch at the lowest point of the weld overlay, engaging the chain drive to rotate the inner track ring in the reverse direction to apply a weld bead on the opposite side of the component.

DRAWINGS

The foregoing aspects and advantages of the present disclosure will become more readily apparent and understood with reference to the following detailed description, when taken in conjunction with the accompanying drawings, wherein.

DETAILED DESCRIPTION

In one embodiment, an apparatus 10 for applying a weld overlay to a nozzle or piping spool of complex configuration is disclosed. In one example, the apparatus 10 comprises a mounting assembly 15, a travel guide 17 and a head assembly 20. The head assembly 20 includes a plurality of orbital weld heads for applying a weld overlay to a nozzle, piping or fitting. In another example, the apparatus 10 provides a new assembly and process that allows an easily mountable system that may operate in a smaller area and avoiding interferences and inability to mount the system. In yet another example, the welding equipment includes a plurality of different drive mechanisms to allow for application of a weld overlay on a potentially irregular surface.

In addition to application of a weld overlay, the welding apparatus equipment system 10 may be utilized for several other applications. For example, the system could be utilized to weld piping joints for similarly complex configurations or in interference constrained piping spools and nozzles.

Figure 1:
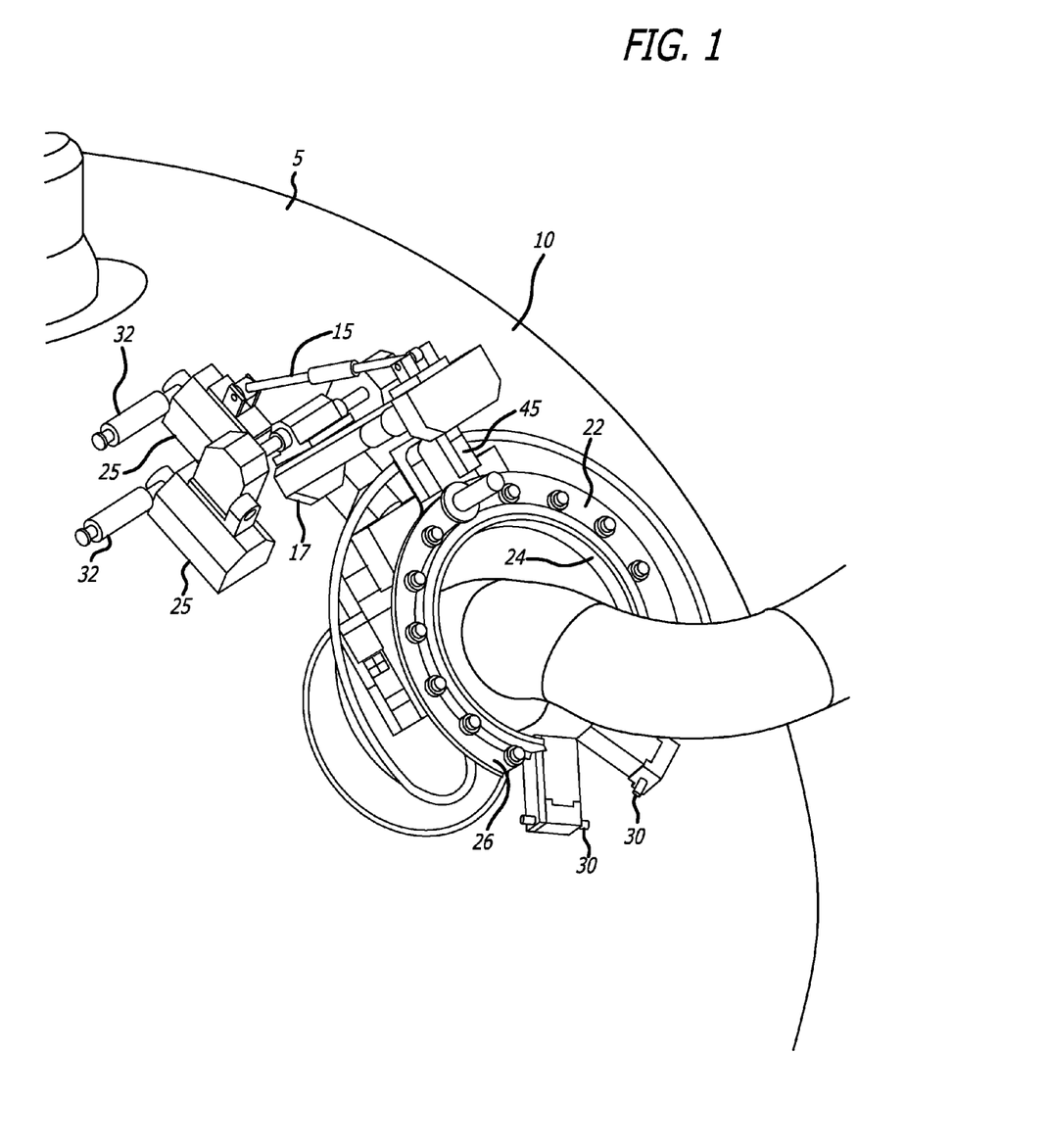
FIG. 1 illustrates an exemplary embodiment of the equipment system. In this embodiment, the system is set up for application of a structural weld overlay on a nozzle section of a pressure vessel having a hemispherical head.
Figure 2:
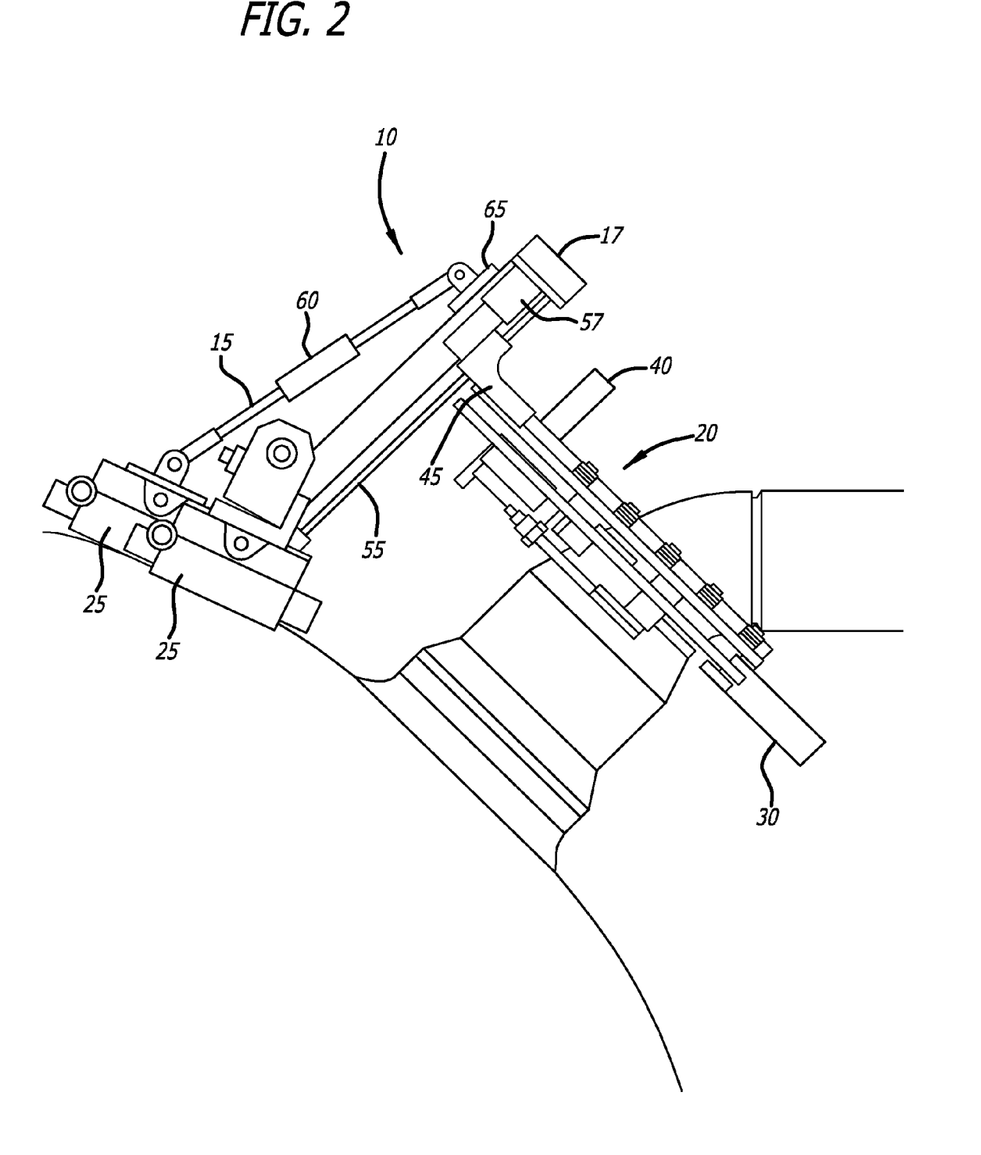
FIG. 2 illustrates a side view of an exemplary embodiment of the equipment system for set up of the weld overlay in FIG. 1.

An exemplary embodiment of the welding apparatus 10 is depicted in FIG. 1 and FIG. 2. A mounting assembly 15 is attached to a structure utilizing magnetic foot pads 25. In one example, the structure illustrated is a pressure vessel with a hemispherical head. However, the structure that the apparatus 10 is attached to may be any metallic structure. In another example, the magnetic foot pads 25 are aligned to correctly position the head portion of the apparatus 10 to apply the weld overlay to an adjacent piping, nozzle or fitting.

In another embodiment, attached to one of the magnetic foot pads 25 is a tension support bar. The tension support bar 60 provides support for the attached head assembly 20. At the opposite end of the tension support bar 60 is an upper attachment pad 65. Additionally, a lower attachment pad 70 is attached to at least one of the other magnetic foot pads 25.

In an additional embodiment, the mounting assembly may comprise a 6-axis magnetically mounted robotic arm for attachment to the travel guide and head assembly. Utilization of a robotic arm rather than a fixed axis attachment provides for utilization of the welding apparatus in more confined areas.

In yet another embodiment, the two attachment pads are attached by a travel guide 17. The travel guide 17 is attached at one end to the upper attachment pad 65. The lower attachment pad 70 is attached at the other end of the travel guide 17. The mounting assembly 15 attached to the travel guide 17 creates a magnetically attached, cantilevered base of attachment and drive for a weld head assembly 20, all of which remain independent of the component section that is to receive the overlay.

In one example, the mounting assembly 15 may provide for a more versatile apparatus than previous welding systems. For example, instead of hooking onto systems with complex geometries or possible interferences, the magnetic foot pads 25 simply attach to an adjacent structure 5. As a result this may reduce and/or eliminate the potential of being unable to apply a weld overlay due to short length of piping and the inability to attach travel or guide rings.

In yet another embodiment, the travel guide 17 includes a drive motor attached to a screw drive shaft 55. A head assembly 20 is attached to the travel guide 17 by a mounting bracket. During application of the weld overlay, the drive motor 57 precisely turns the screw drive shaft 55. As the screw drive shaft 55 is turned, the mounting bracket 45 is moved, putting the head assembly 20 in a new position to apply a subsequent weld bead.

In one example, utilization of a travel guide 17 may provide for a more versatile and useful apparatus. For example, in conventional systems, the travel or guide rings would typically be attached to the component that is being welded. In contrast, in one embodiment of the present invention, since the travel guide 17 may be attached to the mounting assembly 15 located on an adjacent structure 5, less space may be utilized to provide the travel guide 17. Accordingly, weld overlays may be applied to areas with a smaller axial envelope than with conventional welding procedures.

In yet another embodiment, the head assembly 20 includes a track ring 22 having an outer ring and an inner ring. The outer ring of the head assembly 20 is attached to the travel guide 17 with a mounting bracket and enable movement of the head assembly 20 to place any subsequent weld beads. The head assembly 20 includes a drive mechanism located on the outer track ring 26 that engages a chain drive fixed to the inner track ring 24.

In a further embodiment, at least two weld heads are located on the inner ring. For example, the two weld heads are located on opposing sides of the track ring 22. The opposing weld head torches are utilized to apply a weld overlay to a component. To apply a weld bead, a weld head torch is initiated and the drive mechanism is activated to rotate the inner ring about the piping or nozzle.

In another embodiment, to enable placement of the head assembly 20 in the proper position so as to apply the weld overlay, wire feed drive mechanisms 30 are rotated to expose an opening on the track ring 22. By rotating the wire feed drive mechanisms 30, the head assembly 20 may be placed around the section or component to be welded. In one example, the track ring 22 is positioned and centered around the nozzle or piping section to be overlaid and establishes a virtual center line for the overlay process.

In a particular embodiment, the head assembly 20 incorporates a radial self-aligning device. This device allows the head assembly to be centered automatically around the component to be welded, increasing the efficiency in utilization of the welding apparatus 10.

Figure 3:
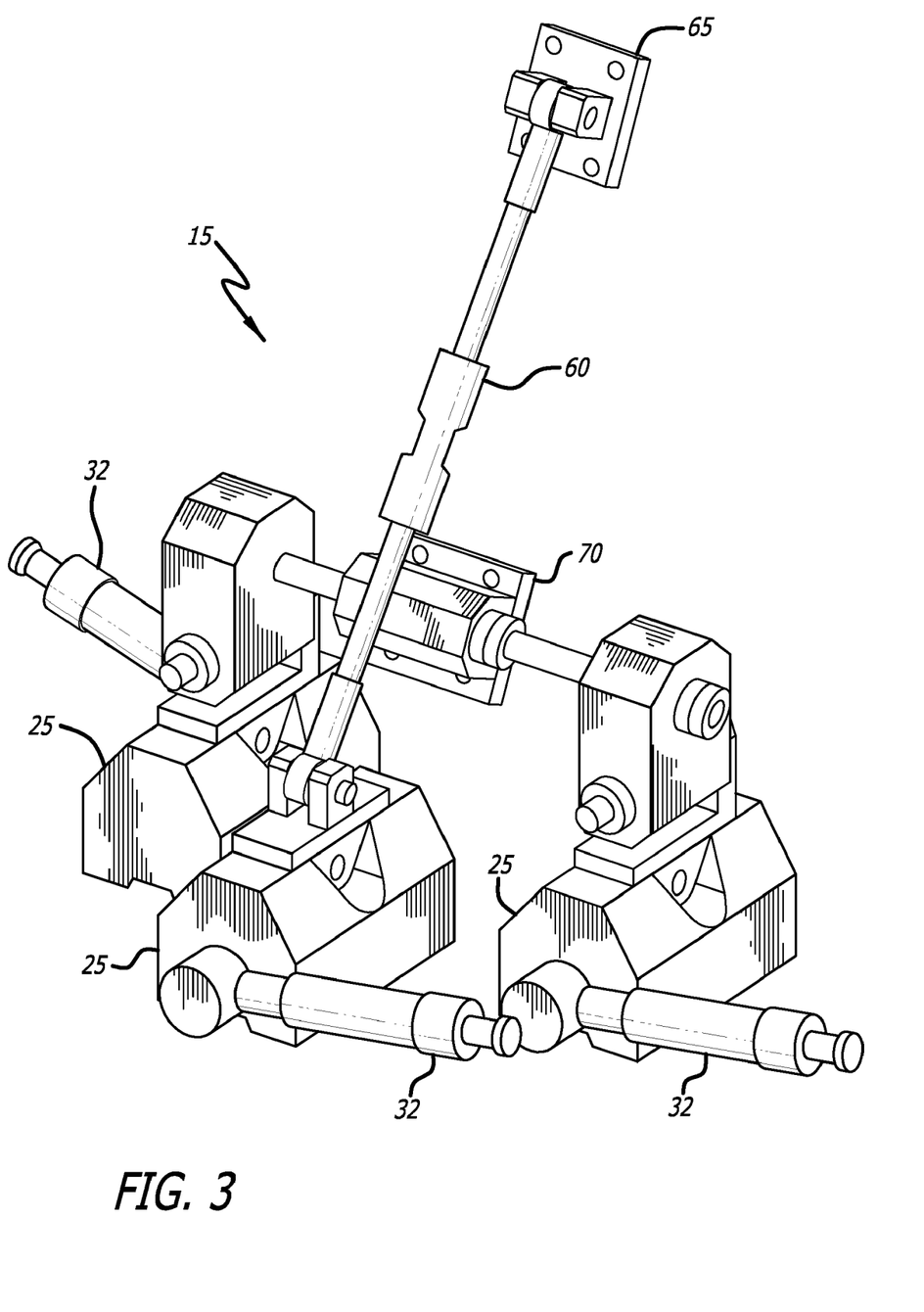
FIG. 3 illustrates the mounting assembly utilized to mount the equipment system to a adjacent structure or tank.

FIG. 3 illustrates another embodiment of the mounting assembly 15 for the welding equipment. In one example, the mounting assembly 15 is attached to a metallic structure utilizing a plurality of magnetic foot pads 25. In one specific example, the mounting assembly 15 includes three magnetic foot pads 25 that attach to the structure or pressure vessel. The magnetic foot pads 25 of the mounting assembly 15 of the welding equipment are positioned on an adjacent metallic component or structure 5.

In another embodiment, attached to each metallic foot pad 25 is an actuator 32. The actuator 32 may assist in facilitating a user of the apparatus 10 to place the metallic foot pad in a desired position. The actuator 32 may also allow a user of the apparatus to easily reposition on and remove the apparatus 10 from the adjacent structure 5.

In a further embodiment, placement of the magnetic foot pads 25 is completed to maintain the alignment of the head portion of the apparatus 10 and establish the virtual center line for the overlay process. For example, utilization of metallic magnetic foot pads 25 may assist in the placement of the apparatus 10 so as to allow for different applications and types of structures. In another example, complex geometries of piping or other difficulties caused from setting up the apparatus 10 may be reduced and/or eliminated. In yet another example, the apparatus 10 may be utilized in different environments and may be utilized in areas that have a short axial length.

In the embodiment depicted in FIG. 3, the top of one of the metallic foot pads 25 is a tension support bar 60. At the top of the tension support bar 60 is an upper attachment pad 65. The tension support bar 60 is attached to the magnetic foot pad 25 by a hinge 62 so that the position of the support bar may be changed depending on the necessary location for the travel guide 17. In one example, since the position of the support bar may be altered, the apparatus 10 may be utilized interchangeably with different locations and types of components that need to be welded.

In this embodiment, a rod extends between and is attached to the two other foot pads 25 on the mounting assembly 15. In the middle of this rod, is a second attachment pad adapted to attach to the opposite end of the travel guide 17.

In one example, the upper attachment pad 65 and lower attachment pad 70 are both utilized to connect to the travel guide 17 resulting in a magnetically attached, cantilevered weld head assembly 20 that remains independent of the component section to receive the weld overlay.

Figure 4:
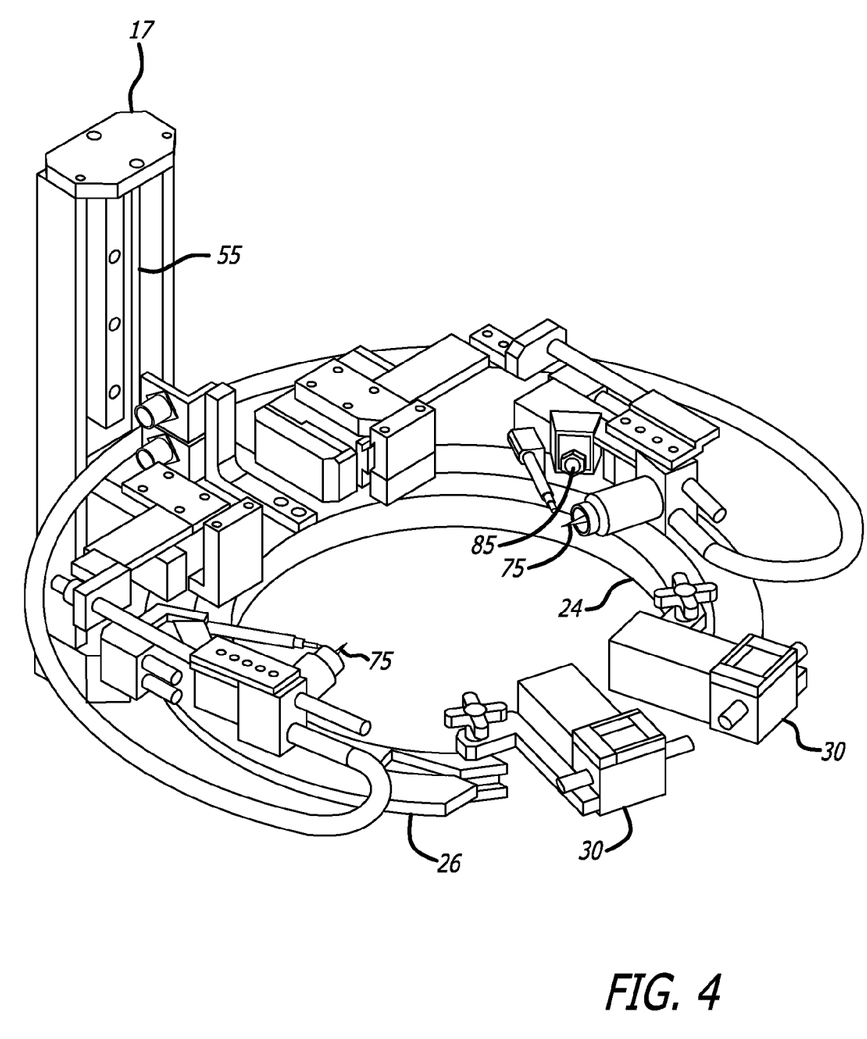
FIG. 4 illustrates the head assembly for the welding equipment as seen from the bottom view of the head assembly of the apparatus.

FIG. 4 is another embodiment and illustrates a bottom view of the head assembly 20 of the apparatus. The travel guide 17 is attached to the outer track ring 26 on the head assembly 20.

Attached to the inner ring is a plurality of program command modules 80 to control the weld head torches 75. Extending from the command modules 80 is a bracket connecting weld head torches 75. The weld head torches 75 are located on opposite sides of the apparatus.

In another example, each of the weld head torches 75 are attached through command modules 80 to the inner ring track. Suitable control modules include command or automatic height control programming so that the torches 75 will adjust to follow the contours of pipe and nozzle transitions to apply an even weld overlay to the component.

In one embodiment, attached to each weld head is a camera visioning module 85. This camera 85 assists in providing for remote supervision of weld bead placement and weld puddle dynamics. As a result, the placement of the weld may be visually monitored to ensure that the weld overlay is being placed properly on the system.

Figure 5:
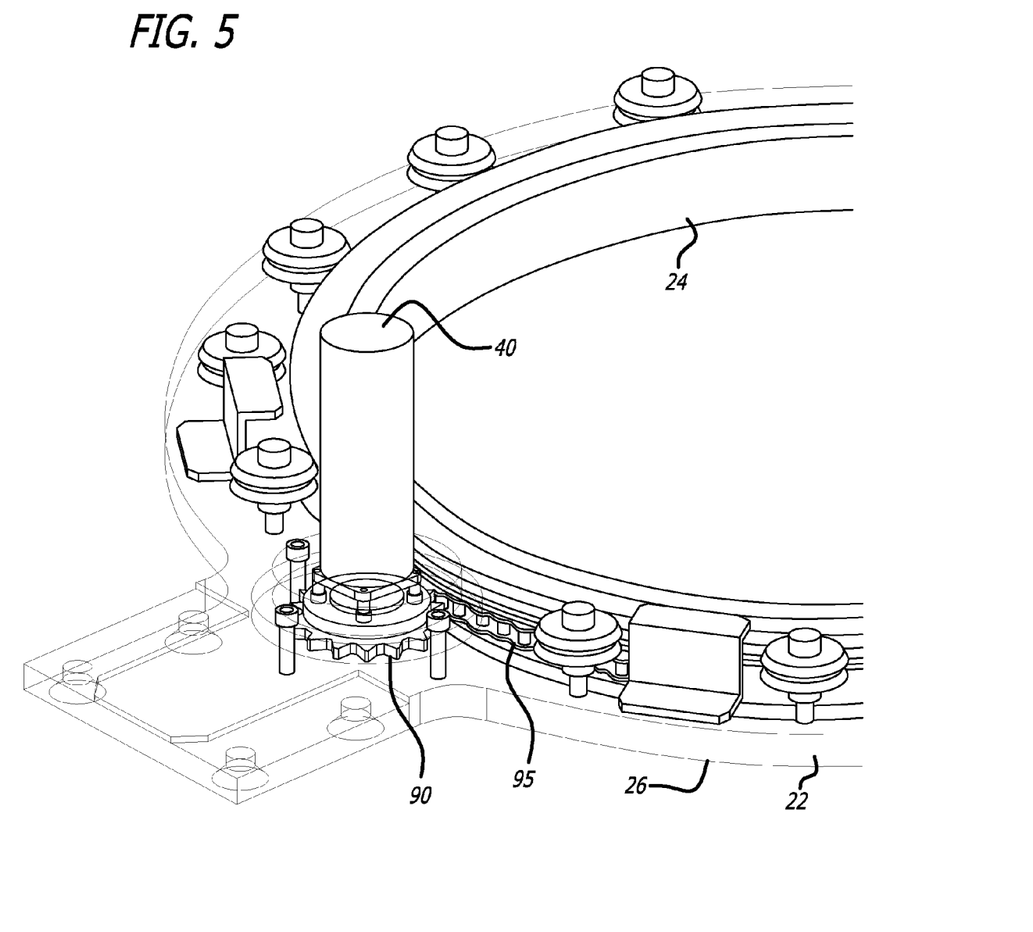
FIG. 5 illustrates the head assembly, particularly the chain drive actuator utilized to rotate the weld heads around the structure being welded.

As illustrated in FIG. 5, the drive mechanism 40 engages the inner track ring 24 to rotate the inner track ring about the component being welded. For example, when the drive mechanism 40 is activated, a chain drive actuator 90 rotates and moves a chain drive 95, and thus the attached inner ring 24 and the attached weld head torches 75 rotate about the component to provide an even weld overlay. In other embodiments, in addition to a chain drive, other types of drives may be used. For example, cable, cords or wires may be utilized in the drive mechanism.

Figure 6:
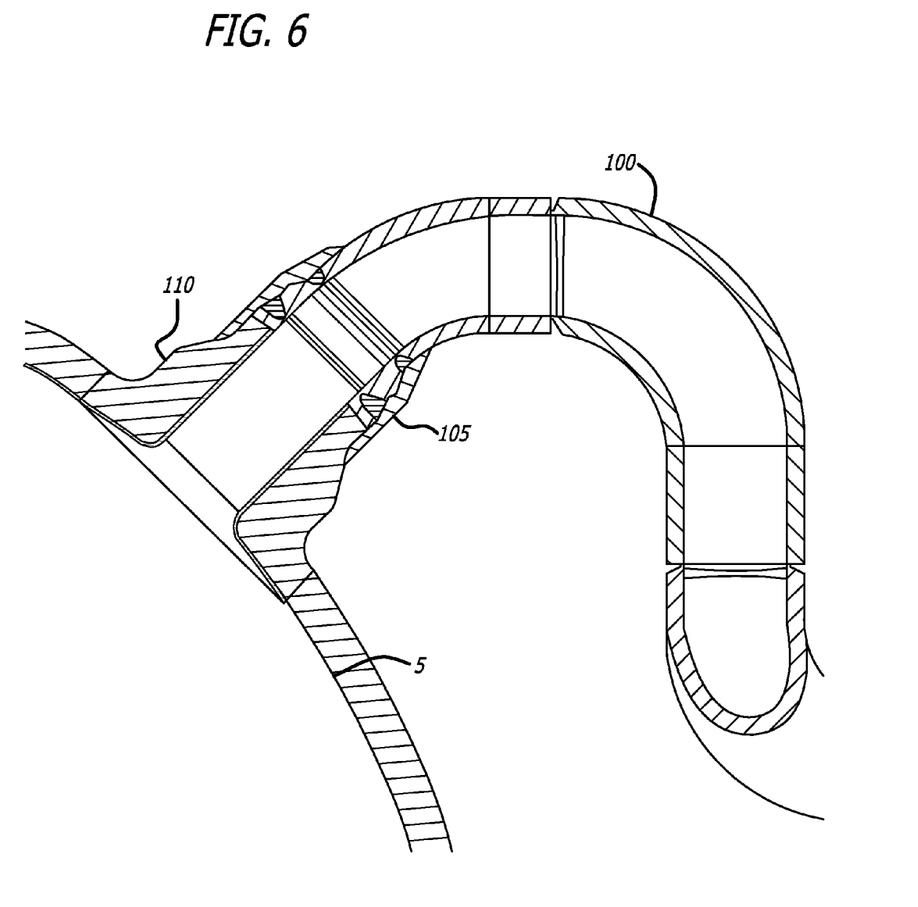
FIG. 6 illustrates the sectional cutaway view of the weld overlay placed on a typical complex nozzle and piping spool.

FIG. 6 illustrates another exemplary component wherein the weld overlay 105 had already been placed utilizing the disclosed apparatus. The shape of the nozzle 110 and piping spool 100 is an example of the type of structure that may be welded with the disclosed apparatus. In other examples, the welding apparatus 10 disclosed herein can also apply a weld overlay to various other shapes and types of nozzles, piping and fittings. For example, the weld overlay 105 depicted could be placed on this section as a repair or as a pre-emptive reinforcement of the nozzle.

It is understood that the disclosed apparatus 10 may be utilized to apply the weld to a variety of different shapes. After the apparatus 10 has been properly aligned on the piping or fitting, the welding operation begins. In an exemplary embodiment, a weld arc initiation using one torch located at the initial point of the design overlay is initiated. In specific examples, the initial point of application is the lowest point on the component. The drive mechanism engages the chain drive fixed to inner track ring 24 to rotate the inner track ring and the attached weld heads about the virtual center line of the weld. The virtual center line of the weld is normally aligned with the axis of the pipe or nozzle section.

For example, this initial weld bead application with the initial weld head torch 75 will proceed for about 170-190 degrees around the component. After the first weld head torch 75 reaches this point, a termination command ends the firing of this weld head torch.

In yet another embodiment, the two weld heads are fixed to be about 180 degrees opposed. After the first weld head torch 75 is terminated, the opposing weld head, the second torch 75, will receive an initiation command and the motor drive 40 will reverse causing the weld bead to be applied on the opposite side of the first bead, applied from the lowest point and intersecting the first bead after 170-190 degrees of travel. When the second torch 75 has completed is travel, the first torch 75 is again in its original starting position.

The attached command module 80 monitors the height of the weld placement and will adjust weld head torch to follow the contours of the pipe and nozzle transitions.

Figure 7:
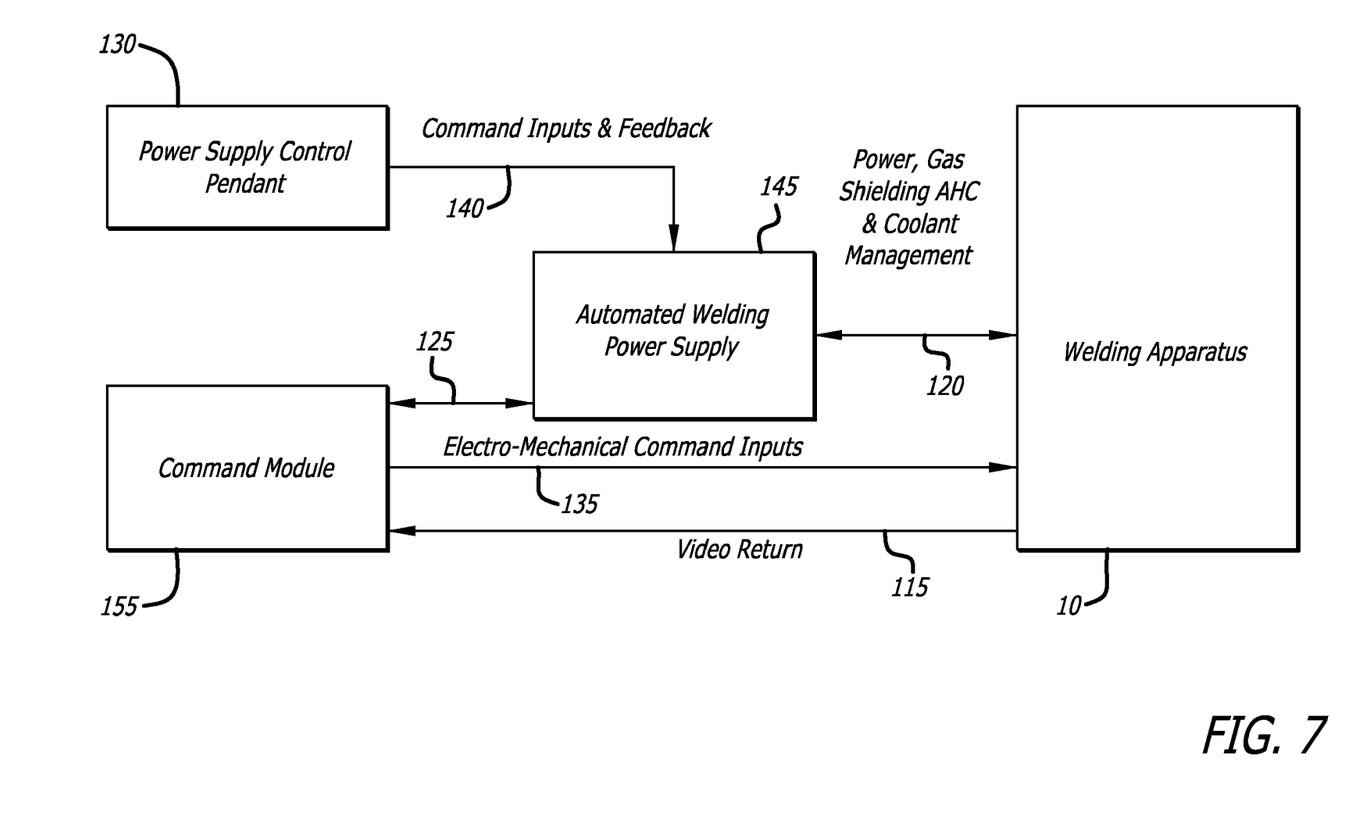
FIG. 7 is a block flow diagram illustrating the system components for the welding system.

In another exemplary embodiment, FIG. 7 illustrates a box diagram illustrating the components of the welding system. The welding head apparatus 10 is attached to a welding power 145 supply via an attachment means. For example, umbilical cords may attach the different components of the system. In one specific example, the welding power supply is utilized for standard operation of the welding apparatus 10. The welding power supply 145 measures voltage and current to monitor application of the weld overlay. Additionally, many other power supplies utilized in the welding industry may also be utilized for the power supply.

In another embodiment, cords attach the welding power supply 145 to a power supply control pendent 130. Command inputs 140 are entered into the power supply control pendent 130 for the proper application of the weld overlay. The command inputs initiate the power welding supply to transmit different commands. Power, gas shielding and coolant management is transmitted 120 from the welding power supply 145 to the welding apparatus 10. Feedback 140 is returned from the welding power supply 145 to the power supply control pendent 130 to help monitor the system.

In another example, electromechanical command inputs 125 are transmitted via an attachment cord from the welding power supply 130 to a command module 80. The command module 80 transfers these inputs 135 to the welding head 10 to initiate the weld torch and apply the weld overlay.

In another embodiment, the welding head apparatus sends a video return 115 to the command module 80. The video return 115 may be monitored remotely to remotely supervise weld bead placement and weld puddle dynamics. If any command inputs need to altered, the inputs can be changed to correctly apply the weld overly.

Conventional systems require a re-wrap of the attached cords to apply the weld overlay on opposing sides of the component to be welded. Since one embodiment of this apparatus may provide a plurality of weld torches fixed on the track ring about 180 degrees opposed, the re-wrap of cables in conventional systems is reduced and/or eliminated.

In another embodiment, the two weld heads may be concurrently managed by alternating control programs. In this embodiment, the two weld head torches are both initiated at the same time, one applying a weld bead in a vertical up weld bead placement, while the other applies a vertical down weld bead placement.

In yet another embodiment, to facilitate placement of a subsequent weld bead onto the component, command programming initiates an index command causing a motor drive 40 to precisely turn a screw drive shaft 55 engaging bracket 45 and repositioning the complete head assembly 20 so that the subsequent weld bead will be located with a specified overlay of the previous bead. An arc-on initiation sequence is then programmed to occur with the first torch 75 placing a bead followed by a reverse rotation of the ring drive while the second torch 75 places a bead.

While the above description contains many particulars, these should not be considered limitations on the scope of the disclosure, but rather a demonstration of embodiments thereof. For example, the welding apparatus 10 and process disclosed herein may include any combination of the different species or embodiments disclosed. Accordingly, it is not intended that the scope of the disclosure be limited in any way by the above description. The various elements of the claims and claims themselves may be combined in any combination, in accordance with the teachings of the present disclosure, which includes the claims.

The invention claimed is:

1. A welding apparatus comprising: a mounting assembly for adjustably attaching the welding apparatus to an adjacent structure, the mounting assembly having a first magnetic foot pad and a second magnetic foot pad, a tension support rod pivotally attached at one end of the first magnetic foot pad, an upper attachment pad pivotally attached at an opposite end of the tension support rod, and a bottom attachment pad pivotally attached to the second magnetic foot pad;

a travel guide, the travel guide attached to the upper attachment pad at one end and the bottom attachment pad at the other end for selectively adjusting a position of the travel guide relative to the adjacent structure on which the first and second magnetic foot pads are attached;

a head assembly attached to the travel guide, the head assembly having:

i) a track ring assembly having an inner ring and an outer ring, ii.) at least two opposed weld torch heads attached to the inner track ring, iii.) at least one wire feed drive mechanism movable on the track ring, and iv.) a drive mechanism located on the outer ring of the track ring, the drive mechanism adapted to permit rotation of the inner track ring and the least two opposed weld torch heads; and wherein the head assembly is for alignment around a centerline axis of a component to be welded and a first weld torch head being for application of a first weld bead at an initial point;

the inner track ring being rotatable by the drive mechanism to apply the first weld bead by the first weld torch head on a side of the component until termination of the first weld torch head;

a second weld torch head being initiated adjacent to the initial point; and the track inner ring being rotatable in the reverse direction to apply a second weld bead by the second weld torch head on an opposite side of the component by the second weld torch head.

2. The welding apparatus of claim 1 wherein there is a third magnetic foot pad and wherein the mounting assembly is attached to a structure other than the ground.

3. The welding apparatus of claim 2 wherein the bottom attachment pad is located on a bar attaching the first and third magnetic foot pads that are not attached to the tension support rod.

4. The welding apparatus of claim 1 wherein the travel guide includes a drive motor, a screw drive shaft and a mounting bracket, wherein the mounting bracket is attached to the head assembly and wherein the mounting bracket is movable along the screw drive shaft for movable adjustment of the head assembly.

5. The welding apparatus of claim 1 wherein the magnetic foot pads have an actuator to facilitate easy removal and placement of the mounting assembly.

6. The welding apparatus of claim 1 wherein the first magnetic foot pad and the second magnetic foot pad are attached to an adjacent component or structure.

7. The welding apparatus of claim 1 further comprising a camera attached to each weld torch head to enable remote monitoring of weld bead placement and weld puddle dynamics.

8. The welding apparatus of claim 1 wherein the first weld torch head and the second weld torch head are attached to a command module that controls movement of the first weld torch head and the second weld torch head so that the first weld torch head and the second weld torch head will adjust to follow contours of the component.

9. The welding apparatus of claim 1 wherein the head assembly is attached to the travel guide by a mounting bracket.

10. The welding apparatus of claim 1 wherein the at least one wire feed drive mechanism is located on the opposite side of the inner track ring from the travel guide.

11. The welding apparatus of claim 1 wherein the drive mechanism comprises a chain fixed to the inner track ring to permit rotation of the inner track ring and the at least two opposed weld torch heads for application of the two weld beads.

12. The welding apparatus of claim 1 wherein the first weld torch head and the second weld torch head are located on the inner ring about 180 degrees opposed.

13. A welding process comprising:

attaching a welding apparatus adjustably to an adjacent structure, wherein the welding apparatus comprises a mounting assembly having a first magnetic foot pad and a second magnetic foot pad, a tension support rod pivotally attached at one end of the first magnetic foot pad, an upper attachment pad pivotally attached at an opposite end of the tension support rod, a bottom attachment pad pivotally attached to the second magnetic foot pad, and a travel guide, aligning a head assembly having an inner track ring and an outer track ring around a centerline axis of a component to be welded, the inner track ring including a first weld torch head opposite a second weld torch head, wherein the head assembly is attached to travel guide;

initiating the first weld torch head at an initial point for application of a first weld bead;

rotating the inner track ring with a drive mechanism to apply the first weld bead by the first weld torch head on a side of the component;

terminating the first weld torch head; and initiating the second weld torch head at the initial point; and rotating the inner track ring in the reverse direction to apply a second weld bead by the second weld torch head on an opposite side of the component.

14. The process of claim 13 further comprising turning a screw drive in the travel guide with a drive motor to reposition the head assembly so that a subsequent weld bead will be placed on the component to apply an overlay of the weld beads.

15. The process of claim 13 further comprising a command module for adjusting the weld head torches to follow contours of the component.

16. The process of claim 13 further comprising remote monitoring of weld bead placement and weld puddle dynamics with a camera attached to each weld head.

17. The process of claim 13 wherein the head assembly includes two wire feed drive mechanisms on the inner track ring on the opposite side of the travel guide, the wire feed mechanisms being movable to permit placing the track ring around the component.

* * * * *